(12) United States Patent
Taniguchi (10) Patent No.: US 11,967,464 B2
(45) Date of Patent: Apr. 23, 2024

(54) METHOD FOR SELECTING MULTILAYER CERAMIC CAPACITOR

(71) Applicant: TAIYO YUDEN CO., LTD., Tokyo (JP)

(72) Inventor: Katsuya Taniguchi, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 102 days.

(21) Appl. No.: 17/896,698

(22) Filed: Aug. 26, 2022

(65) Prior Publication Data

US 2022/0415575 A1 Dec. 29, 2022

Related U.S. Application Data

(62) Division of application No. 16/691,257, filed on Nov. 21, 2019, now abandoned, which is a division of
(Continued)

(30) Foreign Application Priority Data

Feb. 16, 2017 (JP) ................. 2017-027330

(51) Int. Cl.
*H01G 4/12* (2006.01)
*H01G 4/30* (2006.01)

(52) U.S. Cl.
CPC ......... *H01G 4/1209* (2013.01); *H01G 4/1227* (2013.01); *H01G 4/30* (2013.01);
(Continued)

(58) Field of Classification Search
None
See application file for complete search history.

(56) References Cited

U.S. PATENT DOCUMENTS

| 6,043,974 A | 3/2000 | Chen et al. |
| 6,078,494 A | 6/2000 | Hansen |

(Continued)

FOREIGN PATENT DOCUMENTS

| CN | 1978380 A | 6/2007 |
| CN | 105826074 A | 8/2016 |

(Continued)

OTHER PUBLICATIONS

A First Office Action issued by the State Intellectual Property Office of China dated Dec. 21, 2020 for Chinese counterpart application No. 201810127469.X (6 pages).

(Continued)

*Primary Examiner* — Dion R. Ferguson
(74) *Attorney, Agent, or Firm* — Law Office of Katsuhiro Arai (57) ABSTRACT

A selection method includes: obtaining or providing multilayer ceramic capacitors each having a multilayer structure in which each of a plurality of ceramic dielectric layers and each of a plurality of internal electrode layers are alternately stacked; measuring a ratio of (a current value at 10 V/μm when a direct voltage is applied to a plurality of ceramic dielectric layers at 125 degrees C.)/(a current value at 10 V/μm when a direct voltage is applied to the plurality of the ceramic dielectric layers at 85 degrees C.), with respect to each multilayer ceramic capacitor; determining whether the ratio is in a predetermined range; and selecting a multilayer ceramic capacitor or multilayer ceramic capacitors each having a ratio in the predetermined range as a desired multilayer ceramic capacitor.

6 Claims, 6 Drawing Sheets

Related U.S. Application Data application No. 15/889,071, filed on Feb. 5, 2018, now abandoned.

(52) U.S. Cl.
CPC ....... *B32B 2315/02* (2013.01); *B32B 2457/16* (2013.01); *C04B 2235/3206* (2013.01); *C04B 2235/3239* (2013.01); *C04B 2235/3251* (2013.01); *C04B 2235/3256* (2013.01); *C04B 2235/3258* (2013.01); *C04B 2235/78* (2013.01)

(56) References Cited

U.S. PATENT DOCUMENTS

| | | | |
|---|---|---|---|
| 6,437,969 B2 | 8/2002 | Mizuno et al. | |
| 6,656,865 B2 | 12/2003 | Saito et al. | |
| 7,521,390 B2 | 4/2009 | Symes, Jr. et al. | |
| 7,706,125 B2 | 4/2010 | Fukuda et al. | |
| 7,727,922 B2 | 6/2010 | Koebrugge et al. | |
| 9,666,371 B2* | 5/2017 | Morita | H01G 4/1227 |
| 9,721,727 B2* | 8/2017 | Kawamura | C04B 35/4682 |
| 9,919,970 B2 | 3/2018 | Nagaoka et al. | |
| 10,096,425 B2 | 10/2018 | Kawamura et al. | |
| 2002/0016247 A1 | 2/2002 | Mizuno et al. | |
| 2002/0177519 A1 | 11/2002 | Kawamoto et al. | |
| 2005/0219794 A1 | 10/2005 | Iguchi et al. | |
| 2007/0049485 A1 | 3/2007 | Tanabe et al. | |
| 2007/0078049 A1 | 4/2007 | Nonaka et al. | |
| 2010/0195266 A1 | 8/2010 | Morita et al. | |
| 2010/0285947 A1 | 11/2010 | Weir et al. | |
| 2012/0250216 A1 | 10/2012 | Ishii et al. | |
| 2013/0083450 A1 | 4/2013 | Yoon et al. | |
| 2014/0160626 A1 | 6/2014 | Shiota et al. | |
| 2016/0189865 A1 | 6/2016 | Kawamura et al. | |
| 2016/0217924 A1* | 7/2016 | Morita | C04B 35/4682 |
| 2017/0032894 A1* | 2/2017 | Kawamura | H01G 4/1227 |
| 2018/0233284 A1* | 8/2018 | Taniguchi | H01G 4/30 |
| 2020/0090867 A1* | 3/2020 | Taniguchi | H01G 4/1227 |
| 2022/0415575 A1* | 12/2022 | Taniguchi | H01G 4/1209 |

FOREIGN PATENT DOCUMENTS

| | | | |
|---|---|---|---|
| CN | 106409505 A | 2/2017 | |
| JP | H10330160 A | 12/1998 | |
| JP | 2001230150 A | 8/2001 | |
| JP | 2002187770 A | 7/2002 | |
| JP | 2002270455 A | 9/2002 | |
| JP | 2007173714 A | 7/2007 | |
| JP | 2011256091 A | 12/2011 | |
| JP | 2016127120 A | 7/2016 | |
| JP | 2016139720 A | 8/2016 | |
| KR | 1020160092906 A | 8/2016 | |

OTHER PUBLICATIONS

A Second Office Action issued by the State Intellectual Property Office of China dated Jun. 21, 2021 for Chinese counterpart application No. 201810127469.X (4 pages).

An Office Action issued by Korean Intellectual Property Office dated Apr. 27, 2017 for Korean application No. 1020150138453 which is a counterpart of related U.S. Appl. No. 14/945,388, now U.S. Pat. No. 9,721,727. (3 pages).

Final Office Action issued by U.S. Patent and Trademark Office, dated Apr. 7, 2022, for related U.S. Appl. No. 16/691,257 (10 pages).

Final Office Action issued by U.S. Patent and Trademark Office, dated Aug. 8, 2019, for related U.S. Appl. No. 15/889,071, (13 pages).

Final Office Action issued by U.S. Patent and Trademark Office, dated Jan. 25, 2017, for related U.S. Appl. No. 14/945,388, now U.S. Pat. No. 9,721,727. (6 pages).

Non-Final Office Action issued by U.S. Patent and Trademark Office, dated Apr. 15, 2019, for related U.S. Appl. No. 15/889,071, (16 pages).

Non-Final Office Action issued by U.S. Patent and Trademark Office, dated Jul. 15, 2016, for related U.S. Appl. No. 14/945,388, now U.S. Pat. No. 9,721,727. (13 pages).

Non-final Office Action issued by U.S. Patent and Trademark Office, dated Nov. 26, 2021, for related U.S. Appl. No. 16/691,257 (26 pages).

Non-Final Office Action issued by U.S. Patent and Trademark Office, dated Oct. 21, 2016, for related U.S. Appl. No. 15/002,324, now U.S. Pat. No. 9,666,371. (7 pages).

Notice of Allowance issued by U.S. Patent and Trademark Office, dated Apr. 13, 2017, for related U.S. Appl. No. 14/945,388, now U.S. Pat. No. 9,721,727. (10 pages).

Notice of Allowance issued by U.S. Patent and Trademark Office, dated Feb. 10, 2017, for related U.S. Appl. No. 15/002,324, now U.S. Pat. No. 9,666,371. (5 pages).

Notice of Allowance issued by U.S. Patent and Trademark Office, dated May 11, 2017, for related U.S. Appl. No. 14/945,388, now U.S. Pat. No. 9,721,727. (6 pages).

Notice of submission of opinion issued by Korean Intellectual Property Office on May 27, 2022, for Korean counterpart application No. 10-2018-0014491 (4 pages).

* cited by examiner

METHOD FOR SELECTING MULTILAYER CERAMIC CAPACITOR

CROSS-REFERENCE TO RELATED APPLICATION

This application is a divisional application of U.S. patent application Ser. No. 16/691,257, filed on Nov. 21, 2019, which is a divisional application of U.S. patent application Ser. No. 15/889,071, filed on Feb. 5, 2018, now abandoned, which is based upon and claims the benefit of priority of the prior Japanese Patent Application No. 2017-027330, filed on Feb. 16, 2017, the entire contents of both of which are incorporated herein by reference.

FIELD

A certain aspect of the present invention relates to a multilayer ceramic capacitor and a manufacturing method of a multilayer ceramic capacitor.

BACKGROUND

A thickness of a dielectric layer is being reduced because downsizing and enhancement of a capacitance of a multilayer ceramic capacitor are demanded. As a result, electric field intensity applied to the dielectric layer increases. Thereby, life property of the dielectric layer is degraded. And so, it is proposed that a donor element such as Mo (molybdenum), W (tungsten) or the like is added to a dielectric layer in order to improve life property (for example, see Japanese Patent Application Publications No. 2016-139720 and No. 2016-127120).

SUMMARY OF THE INVENTION

However, in the technologies, a position of the donor element in the dielectric layer is not defined. When the donor element exists in a crystal grain of main component ceramic of the dielectric layer, the donor element contributes to the life property of the dielectric layer. A donor element existing in a crystal boundary does not contribute to the life property of the dielectric layer. Therefore, even if a concentration of the donor element of a whole of the dielectric layer is defined, preferable life property is not achieved.

The present invention has a purpose of providing a multilayer ceramic capacitor and a manufacturing method of the multilayer ceramic capacitor that are capable of achieving preferable life property of a dielectric layer.

According to an aspect of the present invention, there is provided a multilayer ceramic capacitor including: a multilayer structure in which each of a plurality of ceramic dielectric layers and each of a plurality of internal electrode layers are alternately stacked, wherein: (a current value at 10 V/μm when a direct voltage is applied to the plurality of the ceramic dielectric layers at 125 degrees C.)/(a current value at 10 V/μm when a direct voltage is applied to the plurality of the ceramic dielectric layers at 85 degrees C.) is more than 5 and less than 20; and a donor element concentration in the plurality of ceramic dielectric layers is 0.05 atm % or more and 0.3 atm % or less.

According to another aspect of the present invention, there is provided a manufacturing method of a multilayer ceramic capacitor including: forming a green sheet of which a concentration of a donor element with respect to a main component ceramic is 0.05 atm % or more and 0.3 atm % or less; forming a multilayer structure by alternately stacking the green sheet and a conductive paste for forming an internal electrode; and baking the multilayer structure, wherein the multilayer structure is sintered in the baking so that, in the multilayer structure after the baking, (a current value at 10 V/μm when a direct voltage is applied to the plurality of the ceramic dielectric layers at 125 degrees C.)/(a current value at 10 V/μm when a direct voltage is applied to the plurality of the ceramic dielectric layers at 85 degrees C.) becomes more than 5 and less than 20.

DETAILED DESCRIPTION

A description will be given of an embodiment with reference to the accompanying drawings.

EMBODIMENT

Figure 1:
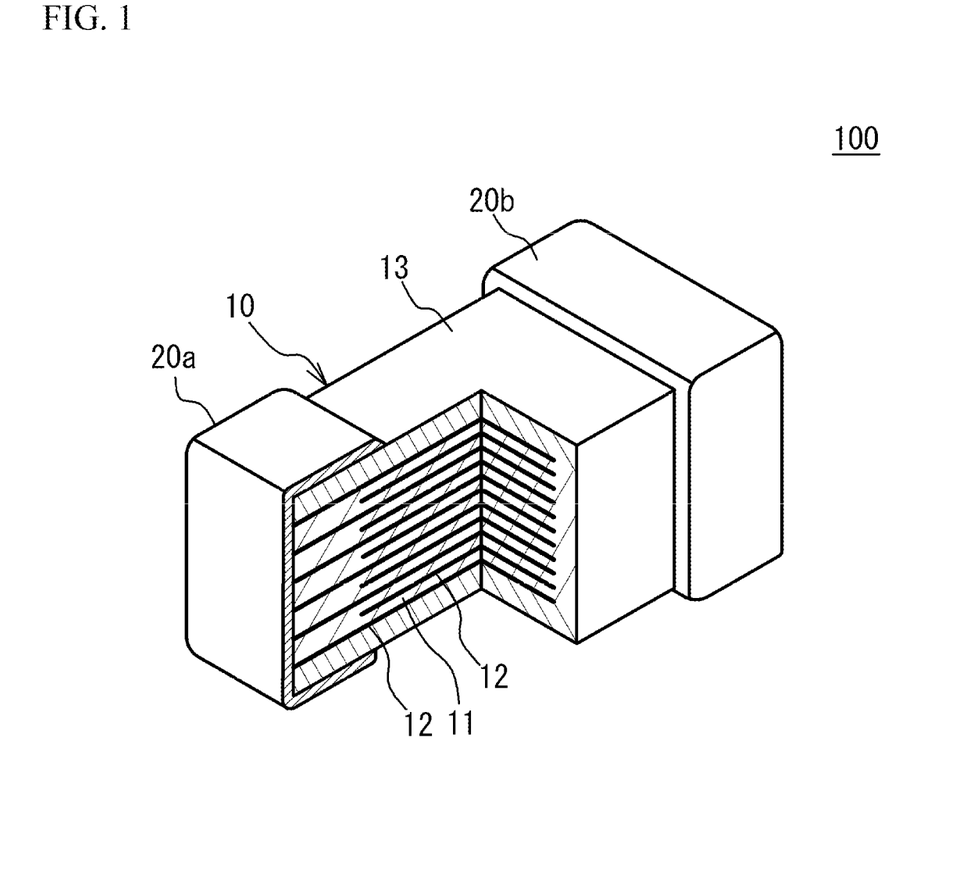
FIG. 1 illustrates a partial perspective view of a multilayer ceramic capacitor.

FIG. 1 illustrates a partial perspective view of a multilayer ceramic capacitor 100 in accordance with an embodiment. As illustrated in FIG. 1, the multilayer ceramic capacitor 100 includes a multilayer chip 10 having a rectangular parallelepiped shape, and a pair of external electrodes 20a and 20b that are respectively provided at two edge faces of the multilayer chip 10 facing each other. In four faces other than the two edge faces of the multilayer chip 10, two faces other than an upper face and a lower face of the multilayer chip 10 in a stacking direction are referred to as side faces. The external electrodes 20a and 20b extend to the upper face, the lower face and the two side faces. However, the external electrodes 20a and 20b are spaced from each other.

The multilayer chip 10 has a structure designed to have dielectric layers 11 and internal electrode layers 12 alternately stacked. The dielectric layer 11 includes ceramic material acting as a dielectric material. The internal electrode layers 12 include a base metal material. End edges of the internal electrode layers 12 are alternately exposed to a first edge face of the multilayer chip 10 and a second edge face of the multilayer chip 10 that is different from the first edge face. In the embodiment, the first face faces with the second face. The external electrode 20a is provided on the first edge face. The external electrode 20b is provided on the second edge face. Thus, the internal electrode layers 12 are alternately conducted to the external electrode 20a and the external electrode 20b. Thus, the multilayer ceramic capacitor 100 has a structure in which a plurality of dielectric layers 11 are stacked and each two of the dielectric layers 11 sandwich the internal electrode layer 12. In the multilayer chip 10, the internal electrode layer 12 is positioned at an outermost layer. The upper face and the lower face of the multilayer chip 10 that are the internal electrode layers 12 are covered by cover layers 13. A main component of the cover layer 13 is a ceramic material. For example, a main component of the cover layer 13 is the same as that of the dielectric layer 11.

For example, the multilayer ceramic capacitor 100 may have a length of 0.2 mm, a width of 0.125 mm and a height of 0.125 mm. The multilayer ceramic capacitor 100 may have a length of 0.4 mm, a width of 0.2 mm and a height of 0.2 mm. The multilayer ceramic capacitor 100 may have a length of 0.6 mm, a width of 0.3 mm and a height of 0.3 mm. The multilayer ceramic capacitor 100 may have a length of 1.0 mm, a width of 0.5 mm and a height of 0.5 mm. The multilayer ceramic capacitor 100 may have a length of 3.2 mm, a width of 1.6 mm and a height of 1.6 mm. The multilayer ceramic capacitor 100 may have a length of 4.5 mm, a width of 3.2 mm and a height of 2.5 mm. However, the size of the multilayer ceramic capacitor 100 is not limited.

A main component of the internal electrode layers 12 is a base metal such as nickel (Ni), copper (Cu), tin (Sn) or the like. The internal electrode layers 12 may be made of a noble metal such as platinum (Pt), palladium (Pd), silver (Ag), gold (Au) or alloy thereof. The dielectric layers 11 are mainly composed of a ceramic material that is expressed by a general formula $ABO_3$ and has a perovskite structure. The perovskite structure includes $ABO_{3-\alpha}$ having an off-stoichiometric composition. For example, the ceramic material is such as $BaTiO_3$ (barium titanate), $CaZrO_3$ (calcium zirconate), $CaTiO_3$ (calcium titanate), $SrTiO_3$ (strontium titanate), $Ba_{1-x-y}Ca_xSr_yTi_{1-z}Zr_zO_3$ ($0 \leq x \leq 1$, $0 \leq y \leq 1$, $0 \leq z \leq 1$) having a perovskite structure. For example, the dielectric layer 11 has a thickness of 1 μm or less or a thickness of 0.8 μm or less.

The dielectric layer 11 includes a donor element. The donor element is an element that can be replaced with an A site of the perovskite $ABO_3$ and can become an ion of which valence is three (a part of rare earth elements such as Y (yttrium), La (lanthanum), Sm (samarium), Gd (gadolinium), Dy (dysprosium) or Ho (Holmium)) or an element that can be replaced with a B site of the perovskite $ABO_3$ and can become ion of which valence is five or more (a part of transition metals such as V (vanadium), Mo (molybdenum), Nb (niobium), W (tungsten) or Ta (tantalum)). For example, when the main component ceramic of the dielectric layer 11 is a perovskite, V (vanadium), Mo, Nb, La, Ta or the like can be used as the donor element. When the dielectric layer 11 includes a donor element, generation of an oxygen defect can be suppressed. Therefore, life property of the dielectric layer 11 is improved. When the donor element concentration of the dielectric layer 11 is excessively low, it may not be possible to achieve the effect of the donor element sufficiently. And so, in the embodiment, the concentration of the donor element in the dielectric layer 11 is 0.05 atm % or more. On the other hand, when the donor element concentration of the dielectric layer 11 is excessively high, insulating property may be degraded or the bias property may be degraded in accordance with solid-solution of the donor element. And so, in the embodiment, the donor element concentration in the dielectric layer 11 is 0.3 atm % or less. "atm %" means a concentration "atm %" of the donor element on the presumption that the B site is 100 atm %.

The main component ceramic of the dielectric layer 11 is not structured with a single crystal grain but includes a plurality of crystal grains. Therefore, the donor element may be equally dispersed in crystal grains and crystal grain boundaries or may be mainly dispersed in the crystal grain boundaries. When the donor element exists in the crystal grains of the main component ceramic, the donor element suppresses the oxygen defect. Therefore, even if the donor element concentration in the dielectric layer 11 is 0.05 atm % or more and 0.3 atm % or less, the donor element does not always contribute to the life property of the dielectric layer 11.

When a temperature increases, electrons are excited to a conduction band in accordance with a donor level of the donor element. In this case, a leak current also increases. When temperature dependence of the leak current is large, the donor element exists in the dielectric layer 11 and is solid-solved in crystal grains of the main component ceramic. Therefore, when a temperature change coefficient of the leak current is large, the donor element contributes to the life property of the dielectric layer 11. And so, the embodiment focuses on a temperature change coefficient of a leak current.

In concrete, (a current value at 10 V/μm when a direct voltage is applied to the dielectric layer 11 at 125 degrees C.)/(a current value at 10 V/μm when a direct voltage is applied to the dielectric layer 11 at 85 degrees C.) is used as the temperature change coefficient of the leak current. In the following, the temperature change coefficient is referred to as a temperature change coefficient (125 degrees C./85 degrees C.).

When the temperature change coefficient (125 degrees C./85 degrees C.) is small, an amount of the donor element in the main component ceramic grains of the dielectric layer 11 is small. In this case, maybe, preferable life property of the dielectric layer 11 is not achieved. And so, the temperature change coefficient (125 degrees C./85 degrees C.) is increased to more than a predetermined value. On the other hand, when the temperature change coefficient (125 degrees C./85 degrees C.) is large, the amount of the donor element in the main component ceramic grains of the dielectric layer 11 is large. In this case, insulating property and bias property of the dielectric layer 11 may be degraded. And so, the temperature change coefficient (125 degrees C./85 degrees C.) is decreased to less than a predetermined value. In the embodiment, the temperature change coefficient (125 degrees C./85 degrees C.) is more than 5 and less than 20. It is therefore possible to suppress the leak current and improve the life property. And, it is preferable that the temperature change coefficient (125 degrees C./85 degrees C.) is more than 6 and less than 15.

It is possible to calculate the temperature change coefficient by changing an ambient temperature with use of a thermostatic chamber, applying a direct voltage of 10 V/μm between the external electrode 20a and the external electrode 20b, and measuring a leak current after 60 seconds after the applying.

It is preferable that at least a part of the dielectric layer 11 in which a voltage difference occurs has preferable life property. Therefore, at least a part of the dielectric layer 11 having an electrical capacity of the multilayer ceramic capacitor 100 has preferable life property. And so, the dielectric layer 11 in a region in which the internal electrode layer 12 connected to the external electrode 20a faces with the internal electrode layer 12 connected to the external electrode 20b includes a donor element of which concentration is 0.05 atm % or more and 0.3 atm % or less, and has property of 5<the temperature change coefficient (125 degrees C./85 degrees C.)<20.

When an average grain diameter of the main component ceramic of the dielectric layer 11 is small, a dielectric constant becomes smaller. And, maybe, a preferable electrostatic capacitance is not achieved. And so, it is preferable that an average grain diameter of the main component ceramic of the dielectric layer 11 is 80 nm or more. On the other hand, when the average grain diameter of the main component ceramic of the dielectric layer 11 is large, an area of grain boundaries acting as a movement barrier of oxygen defects is reduced in the dielectric layer 11 having a thickness of 1 μm or less and the life property may be degraded. And so, it is preferable that the average grain diameter of the main component ceramic of the dielectric layer 11 is 200 nm or less. The grain diameters are Feret diameters that are measured by adjusting a scale factor so that a single image of a scanning electron microscope or a transmission electron microscope includes 80 to 150 crystal grains, capturing a plurality of images so that a total number of the crystal grains is 400 or more, and measuring all Feret diameters of all of the crystal grains on the images. The average grain diameter is an average of the Feret diameters.

Figure 2:
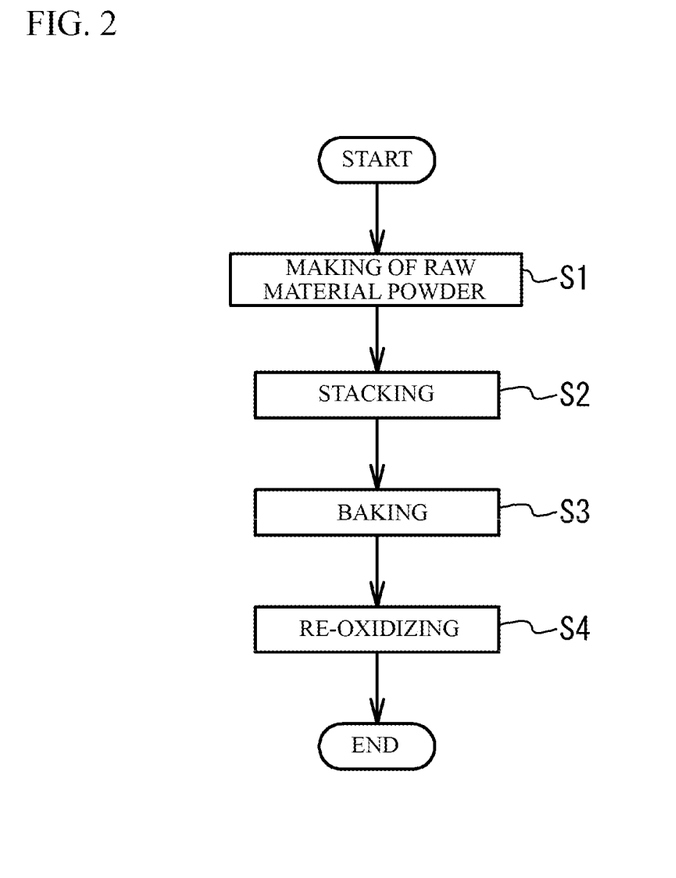
FIG. 2 illustrates a flowchart of a manufacturing method of a multilayer ceramic capacitor.

Next, a description will be given of a manufacturing method of the multilayer ceramic capacitor 100. FIG. 2 illustrates a manufacturing method of the multilayer ceramic capacitor 100.

(Making process of raw material powder) A ceramic material powder is prepared as a main component of the dielectric layer 11. A donor element may be included in the dielectric layer 11 by mixing a ceramic material and a donor element source. However, it is preferable that a ceramic material in which a donor element is solid-solved in advance is used. When the donor element is Mo, Mo compound such as $MoO_3$ may be used as the donor element source.

Next, additive compound may be added to ceramic powder material, in accordance with purposes. The additive compound may be an oxide of Mg (magnesium), Mn (manganese), V (vanadium), Cr (chromium) or a rare earth element (Y (yttrium), Dy (dysprosium), Tm (thulium), Ho (holmium), Tb (terbium), Yb (ytterbium), Sm (samarium), Eu (europium), Gd (gadolinium) and Er (erbium)), or an oxide of Co (cobalt), Ni (nickel), Li (lithium), B (boron), Na (sodium), K (potassium) and Si (silicon), or glass. For example, compound including additive compound is added to a ceramic material powder and is calcined. Next, the resulting ceramic material grains are wet-blended with additive compound, is dried and is crushed. Thus, the ceramic material powder is prepared.

(Stacking Process) Next, a binder such as polyvinyl butyral (PVB) resin, an organic solvent such as ethanol or toluene, and a plasticizer such as dioctyl phthalate (DOP) are added to the resulting ceramic material powder and wet-blended. With use of the resulting slurry, a strip-shaped dielectric green sheet with a thickness of 0.8 μm or less is coated on a base material by, for example, a die coater method or a doctor blade method, and then dried.

Then, a pattern of the internal electrode layer 12 is provided on the surface of the dielectric green sheet by printing a conductive paste for forming the internal electrode with use of screen printing or gravure printing. The conductive paste includes powder of the main component metal of the internal electrode layer 12, a binder, a solvent, and additives as needed. It is preferable that the binder and the solvent are different from those of the above-mentioned ceramic slurry. As a co-material, the ceramic material that is the main component of the dielectric layer 11 may be distributed in the conductive paste.

Then, the dielectric green sheet on which the internal electrode layer pattern is printed is stamped into a predetermined size, and a predetermined number (for example, 200 to 500) of stamped dielectric green sheets are stacked while the base material is peeled so that the internal electrode layers 12 and the dielectric layers 11 are alternated with each other and the end edges of the internal electrode layers 12 are alternately exposed to both edge faces in the length direction of the dielectric layer so as to be alternately led out to a pair of external electrodes of different polarizations.

Cover sheets, which are to be the cover layers 13, are compressed on the stacked green sheets and under the stacked sheets. The resulting compact is cut into a predetermined size (for example, 1.0 mm×0.5 mm). Thus, a ceramic multilayer structure having a rectangular parallelepiped shape is obtained.

(Baking process) Next, after removing the binder in $N_2$ atmosphere at 250 degrees C. to 500 degrees C., the resulting ceramic multilayer structure is baked for ten minutes to 2 hours in a reductive atmosphere in a temperature range of 1100 degrees C. to 1300 degrees C. Thus, each compound structuring the dielectric green sheet is sintered. In this manner, a sintered structure having the multilayer chip 10 having the multilayer structure in which the sintered dielectric layers 11 and the sintered internal electrode layers 12 are alternately stacked and having the cover layers 13 formed as outermost layers of the multilayer chip 10 in the stack direction is obtained.

(Re-oxidizing process) After that, a re-oxidizing process may be performed at 600 degrees C. to 1000 degrees C. in $N_2$ gas atmosphere.

EXAMPLES (Example 1) In an example 1, barium titanate was used as the main component ceramic of the dielectric layer 11. Mo was used as the donor element. $MoO_3$ was added to the main component ceramic powder so that Mo is 0.2 atm % on a presumption that Ti of the main component ceramic powder is 100 atm %. The resulting main component ceramic powder was sufficiently wet-blended and crushed with a ball mil. Thus, the dielectric material was obtained. An organic binder and a solvent were added to the dielectric material. And dielectric green sheets were made by a doctor blade method. The organic binder was polyvinyl butyral (PVB) resin or the like. The solvent was ethanol, toluene or the like. And a plasticizer and so on were added. Next, the conductive paste for forming the internal electrode layer 12 was made by mixing powder acting as a main component metal of the internal electrode layer 12, a binder, a solvent and an additive as needed. The organic binder and the solvent were different from those of the dielectric green sheet. The conductive paste was screen-printed on the dielectric sheet. 500 of the dielectric green sheets on which the conductive paste for forming the internal electrode layer were stacked, and cover sheets were stacked on the stacked dielectric green sheets and under the stacked dielectric green sheets. After that, a ceramic multilayer structure was obtained by a thermal compressing. And the ceramic multilayer structure was cut into a predetermined size. The thickness of the dielectric layer 11 after the baking was 0.8 μm.

(Example 2) In an example 2, a main component ceramic powder in which 0.05 atm % of Mo was solid-solved in advance was used as the dielectric material. A Mo source was not added to the main component ceramic powder. Other conditions were the same as those of the example 1.

(Example 3) In an example 3, a main component ceramic powder in which 0.1 atm % of Mo was solid-solved in advance was used as the dielectric material. A Mo source was not added to the main component ceramic powder. Other conditions were the same as those of the example 1.

(Example 4) In an example 4, a main component ceramic powder in which 0.2 atm % of Mo was solid-solved in advance was used as the dielectric material. A Mo source was not added to the main component ceramic powder. Other conditions were the same as those of the example 1.

(Example 5) In an example 5, a main component ceramic powder in which 0.3 atm % of Mo was solid-solved in advance was used as the dielectric material. A Mo source was not added to the main component ceramic powder. Other conditions were the same as those of the example 1.

(Comparative example 1) In a comparative example 1, a Mo source was not added to a main component ceramic powder. Other condition were the same as those of the example 1.

(Comparative example 2) In a comparative example 2, a main component ceramic powder in which 0.35 atm % of Mo was solid-solved in advance was used as the dielectric material. A Mo source was not added to the main component ceramic powder. Other conditions were the same as those of the example 1.

Figure 3A:
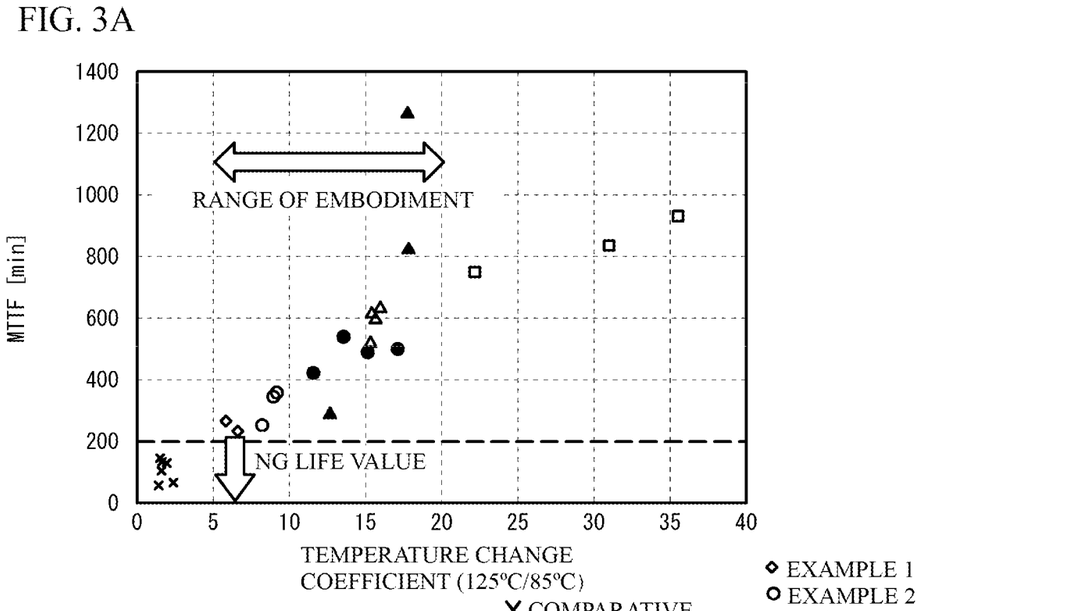
FIG. 3A and FIG. 3B illustrate a relationship between temperature change coefficients (125 degrees C./85 degrees C.) and accelerated life values of examples 1 to 5 and comparative examples 1 and 2.

(Analysis) FIG. 3A illustrates a relationship between temperature change coefficients (125 degrees C./85 degrees C.) and accelerated life values of the examples 1 to 5 and the comparative examples 1 and 2. In FIG. 3A, the accelerated life values are expressed as MTTF (Mean Time To Failure). The accelerated life value was measured by applying a direct voltage of 10 V between the external electrode 20a and the external electrode 20b at 125 degrees C., measuring a leak current value with an ampere meter, and measuring a time to a dielectric breakdown. The mean time to failure is an average of times to the dielectric breakdown of 20 numbers of the multilayer ceramic capacitors.

Figure 3B:
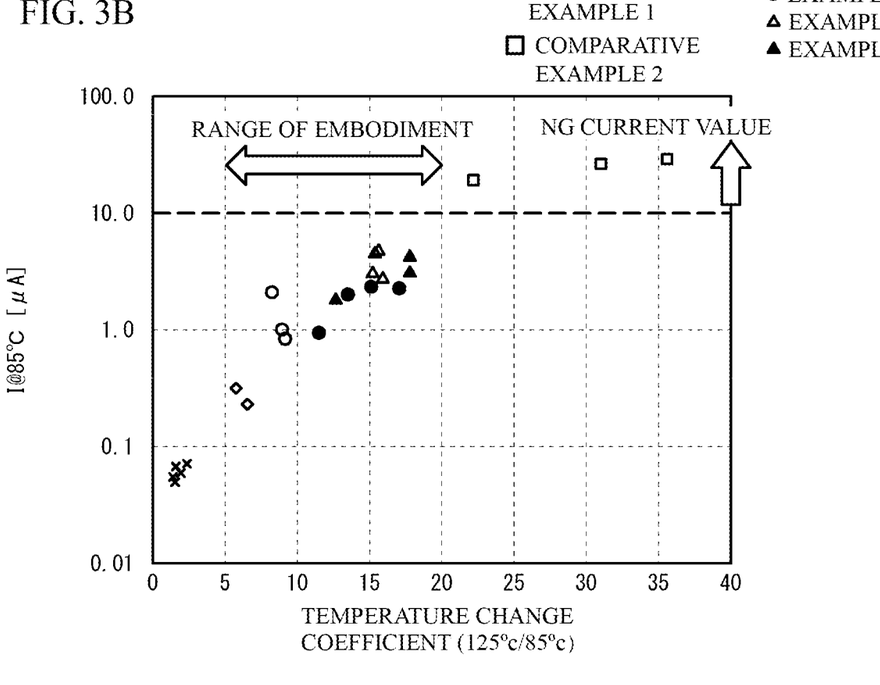

As illustrated in FIG. 3A, a correlation occurs between the temperature change coefficient (125 degrees C./85 degrees C.) and the accelerated life values. In the comparative example 1 in which a donor element was not added (barium titanate in which Mo was not added), the temperature change coefficient (125 degrees C./85 degrees C.) was approximately 2 that was a small value. And the accelerated life value was 200 min or less that was a small value. Therefore, a preferable life value was not achieved. In the example 1 (barium titanate in which Mo was added) in which the main component ceramic powder and the Mo source were mixed with each other and were baked, the temperature change coefficient (125 degrees C./85 degrees C.) was approximately 5 that was a relatively large value. The accelerated life value was approximately 200 min to 300 min that was a long life property. In the examples 2 to 5 (barium titanate in which Mo was solid-solved) in which the main component ceramic powder in which Mo was solid-solved in advance was sintered, the temperature change coefficient (125 degrees C./85 degrees C.) was 7 to 20 that was a larger value than that of the example 1. The accelerated life value was approximately 200 min to 1200 min that was a larger value than that of the example 1. However, when the temperature change coefficient (125 degrees C./85 degrees C.) was more than 20 as in the case of the Comparative example 2, the leak current value at 85 degrees C. increased by two orders or more with respect to the barium titanate in which Mo was not added, as illustrated in FIG. 3B.

From the results, it is demonstrated that when the donor element concentration in the dielectric layer 11 is 0.05 atm % to 0.3 atm % and the temperature change coefficient (125 degrees C./85 degrees C.) is more than 5 and less than 20, it is possible to suppress the leak current and it is possible to improve the life property.

Figure 4:
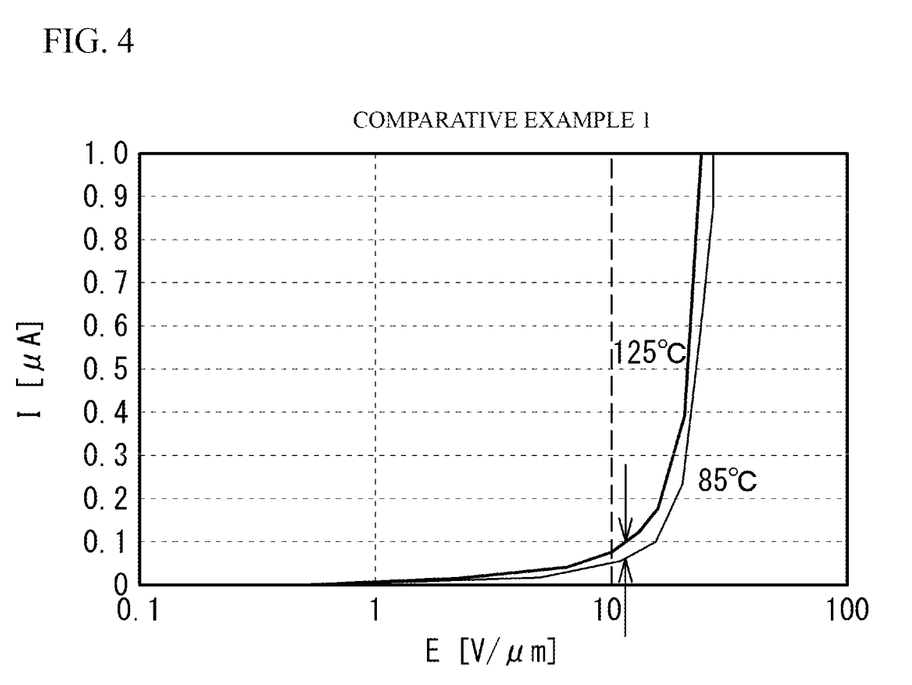
FIG. 4 illustrates a relationship among a temperature change, a leak current value and an applied voltage of a multilayer ceramic capacitor of a comparative example 1.

FIG. 4 illustrates a relationship among a temperature change, a leak current value and an applied voltage of the multilayer ceramic capacitor 100 of the comparative example 1. As illustrated in FIG. 4, when a donor element was not added to the dielectric layer 11, there was little changing of the leak current value with respect to the temperature. It is thought that this is because a donor element was not solid-solved in crystal grains of the main component ceramic of the dielectric layer 11.

Figure 5:
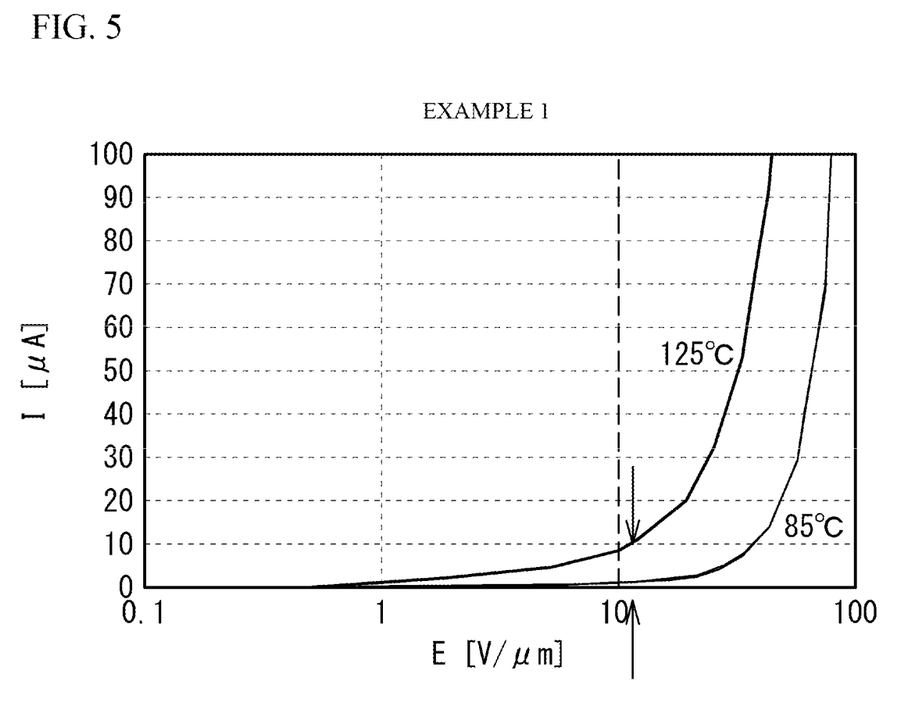
FIG. 5 illustrates a relationship among a temperature change, a leak current value and an applied voltage of a multilayer ceramic capacitor of an example 1.

FIG. 5 illustrates a relationship among a temperature change, a leak current value and an applied voltage in the multilayer ceramic capacitor 100 of the example 1. As illustrated in FIG. 5, when a donor element was added to the dielectric layer 11, a temperature change appears in the leak current value. It is thought this because a part of donor elements were solid-solved in crystal grains of the main component ceramic of the dielectric layer 11.

Figure 6:
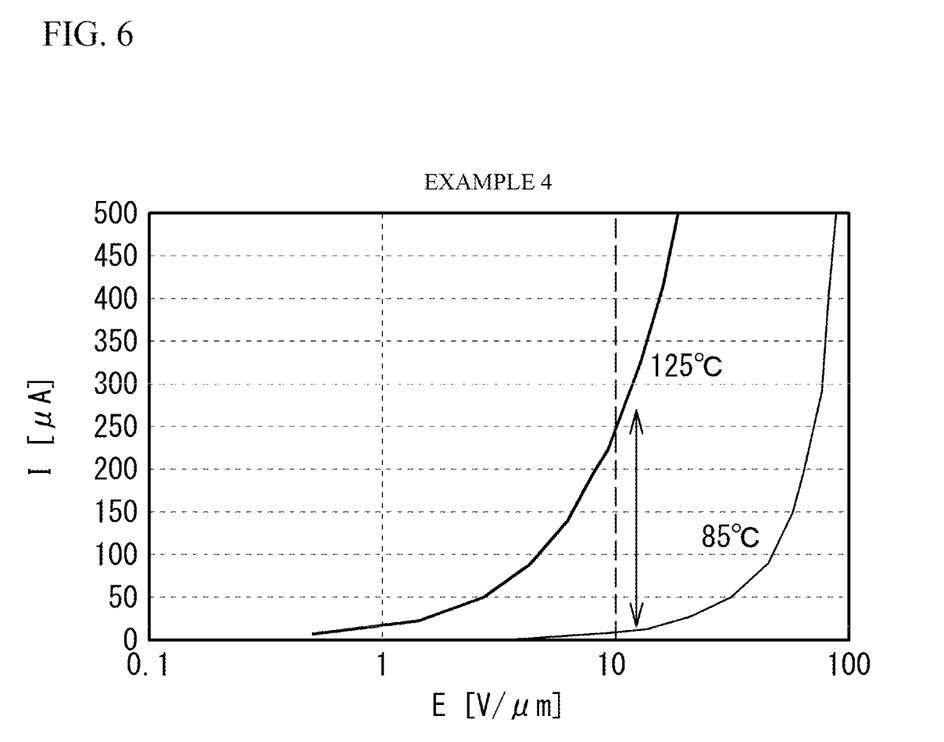
FIG. 6 illustrates a relationship among a temperature change, a leak current value and an applied voltage of a multilayer ceramic capacitor of an example 4.

FIG. 6 illustrates a relationship among a temperature change, a leak current value and an applied voltage in the multilayer ceramic capacitor 100 of the example 4. A total added amount of Mo in the dielectric layer 11 in the example 1 was the same as that in the example 4. However, as illustrated in FIG. 6, the changing of the leak current value with respect to the temperature became larger than FIG. 5. It is thought that this is because the barium titanate in which a donor element was solid-solved in advance was used, and a lot of donor elements exist in crystal grains of the main component ceramic of the dielectric layer 11. From the results of FIG. 4 to FIG. 6, it is demonstrated that when the main component ceramic powder in which a donor element was solid-solved in advance was used, a lot of donor elements exist in crystal grains.

Although the embodiments of the present invention have been described in detail, it is to be understood that the various change, substitutions, and alterations could be made hereto without departing from the spirit and scope of the invention.

The invention claimed is:

1. A selection method comprising:
obtaining or providing multilayer ceramic capacitors each having a multilayer structure in which each of a plurality of ceramic dielectric layers and each of a plurality of internal electrode layers are alternately stacked;
measuring a ratio of (a current value at 10 V/μm when a direct voltage is applied to a plurality of ceramic dielectric layers at 125 degrees C.)/(a current value at 10 V/μm when a direct voltage is applied to the plurality of the ceramic dielectric layers at 85 degrees C.), with respect to each multilayer ceramic capacitor;
determining whether the ratio is in a predetermined range; and
selecting a multilayer ceramic capacitor or multilayer ceramic capacitors each having a ratio in the predetermined range as a desired multilayer ceramic capacitor.

2. The selection method as claimed in claim 1, wherein the predetermined range is more than 5 and less than 20.

3. The selection method as claimed in claim 1, wherein an average grain diameter of the plurality of ceramic dielectric layers is 80 nm or more and 200 nm or less.

4. The selection method as claimed in claim 1, wherein the each of the plurality of ceramic dielectric layers includes a donor element that is at least one of V, Mo, Nb, La, W and Ta.

5. The selection method as claimed in claim 1, wherein a thickness of the plurality of ceramic dielectric layers is 1 μm or less.

6. The selection method as claimed in claim 1, where a main component ceramic of the plurality of ceramic dielectric layers has a perovskite structure.

* * * * *